US012416581B2

(12) United States Patent
Bock et al.

(10) Patent No.: US 12,416,581 B2
(45) Date of Patent: Sep. 16, 2025

(54) SUPPORT RING CENTERING FOR CLOSURE INSPECTION (71) Applicant: KRONES AG, Neutraubling (DE)

(72) Inventors: Thomas Bock, Hemau (DE); Anton Niedermeier, Offenstetten (DE)

(73) Assignee: KRONES AG, Neutraubling (DE)

( * ) Notice: Subject to any disclaimer, the term of this patent is extended or adjusted under 35 U.S.C. 154(b) by 48 days.

(21) Appl. No.: 18/242,458

(22) Filed: Sep. 5, 2023

(65) Prior Publication Data

US 2024/0077428 A1 Mar. 7, 2024

(30) Foreign Application Priority Data

Sep. 5, 2022 (DE) ...................... 10 2022 122 477.5

(51) Int. Cl.
G01N 21/90 (2006.01)
(52) U.S. Cl.
CPC ....... *G01N 21/9054* (2013.01); *G01N 21/909* (2013.01); *G01N 2201/068* (2013.01)
(58) Field of Classification Search
CPC ......... B67B 3/264; B67B 3/261; B67B 3/262; B67B 3/26; B67B 3/204; G01N 21/909; G01N 21/9054; G01N 21/90; G01N 21/9027; G01N 21/8806; G01N 21/9009; G01N 21/9081; G01N 21/9036; G01N 21/01; G01N 21/95; G01N 21/8803; G01N 2021/8822; G01N 2021/8845;

(Continued)

(56) References Cited

U.S. PATENT DOCUMENTS 9,417,145 B2 * 8/2016 Cochran .............. G01N 21/909
2011/0164131 A1 * 7/2011 Wiemer ................ B67B 3/262
348/127

(Continued)

FOREIGN PATENT DOCUMENTS

CN 105247857 A * 1/2016 ............. B67B 3/261
CN 104169206 B * 10/2016 ............... B67B 3/26

(Continued)

OTHER PUBLICATIONS

Search Report issusd in German Patent Appln. Serial No. 10 2022 122 476.7, dated Jul. 20, 2023, with machine English translation, 14 pages.

(Continued)

*Primary Examiner* — Michael P Stafira
(74) *Attorney, Agent, or Firm* — HAYES SOLOWAY P.C.

(57) ABSTRACT

A method for inspecting containers with closures with a cap portion and a circumferential edge extending around the mouth of the containers. The containers are transported along a transport path by a transport device. During transport, the mouth regions of the containers with closures are illuminated by an illumination device, and at least one image recording device records at least one image of the mouth regions of the containers with closures, and records at least one spatially resolved image of a portion of the circumferential edge and one structure on the circumferential edge is detected, and, at least one value of this structure, a value characteristic of a relative position of the closure relative to the container and/or relative to the rotationally symmetrical element and/or of the closure is determined.

20 Claims, 6 Drawing Sheets (58) Field of Classification Search
CPC ....... G01N 2021/8887; G01N 21/8851; G01N 2015/0053; G01N 2021/8909; G01N 21/88; G01N 21/89; G01N 2201/061; G01N 2201/0635; G01N 15/06; G01N 15/075; G01N 15/10; G01N 15/1468; G01N 2021/8455; G01N 21/3563; G01N 21/958; G01N 2291/101; G01N 29/036; G01N 29/222; G01N 29/2418; G01N 29/348; G01N 15/082; G01N 2021/8819; G01N 2021/8883; G01N 21/4738; G01N 21/9018; G01N 2201/0633; G01N 33/0096; G01N 35/04; G01N 2021/8812; G01N 21/84; G01N 21/9072; G01N 2201/065; G01N 2201/068; G01N 23/2273; G01N 30/7206; G01N 33/00; G01N 33/0081; G01N 2021/0112; G01N 2021/887; G01N 2021/8896; G01N 2021/9511; G01N 2021/9583; G01N 21/8914; G01N 21/896; G01N 21/93; G01N 2201/062; G01N 15/0227; G01N 2021/8427; G01N 2035/0405; G01N 2035/0462; G01N 2035/0467; G01N 2035/0472; G01N 21/8422; G01N 2201/06113; G01N 23/04; G01N 23/083; G01N 31/226; G01N 35/00732; G01N 35/021; G01N 21/9515; G01N 21/954; G01N 27/205; G01N 2021/1776; G01N 21/3577; G01N 2201/0686; G01N 2291/2695; G01N 3/08; G01N 2021/8411; G01N 2021/9516; G01N 21/6408; G01N 21/6428; G01N 21/6486; G01N 21/65; G01N 21/9508; G01N 2201/10; G01N 2201/103; G01N 2201/106; G01N 2203/0017; G01N 2203/0066; G01N 2203/0067; G01N 2203/04; G01N 2203/0623; G01N 2203/0676; G01N 2291/02827; G01N 2291/2634; G01N 25/72; G01N 29/14; G01N 29/227; G01N 3/00; G01N 3/066; G01N 33/386; G01N 33/388; G01N 33/574; G01N 33/57496; G01N 1/02; G01N 2001/028; G01N 2800/52; G01N 3/307; G01N 33/57415; G01N 33/57484; G01N 2001/2833; G01N 2021/845; G01N 2021/8841; G01N 2021/8848; G01N 2021/8854; G01N 21/952; G01N 2201/104; G01N 2203/0025; G01N 2203/023; G01N 2203/0282; G01N 27/61; G01N 3/24; G01N 30/02; G01N 1/00; G01N 1/04; G01N 1/10; G01N 1/2226; G01N 1/28; G01N 1/2806; G01N 1/2813; G01N 1/286; G01N 1/31; G01N 1/312; G01N 2001/284; G01N 2021/399; G01N 2021/8835; G01N 2021/8838; G01N 21/00; G01N 21/31; G01N 21/33; G01N 21/3504; G01N 21/39; G01N 21/55; G01N 21/9045; G01N 2201/0221; G01N 2201/0621; G01N 2201/0695; G01N 2291/023; G01N 2291/044; G01N 2291/267; G01N 2333/4703; G01N 2333/70589; G01N 25/54; G01N 29/046; G01N 29/225; G01N 29/30; G01N 3/303; G01N 30/06; G01N 30/14; G01N 30/34; G01N 30/7233; G01N 33/14; G01N 33/5302; G01N 33/54346; G01N 33/54366; G01N 33/56972; G01N 33/57492; G01N 33/577; G01N 33/587; G01N 33/66; G01N 33/6872; G01N 35/0098; G01N 35/1002

See application file for complete search history.

(56) References Cited

U.S. PATENT DOCUMENTS

| | | | | |
|---|---|---|---|---|
| 2014/0311256 | A1* | 10/2014 | Cochran | G01L 5/24 73/862.08 |
| 2015/0308964 | A1* | 10/2015 | Schorn | G01N 21/90 356/240.1 |
| 2018/0172603 | A1* | 6/2018 | Piana | B67B 3/261 |
| 2023/0341335 | A1 | 10/2023 | Niedermeier et al. | G01N 21/90 |

FOREIGN PATENT DOCUMENTS

| | | | | | |
|---|---|---|---|---|---|
| DE | 102017211036 | A1 | * | 1/2019 | |
| DE | 102017119074 | | | 2/2019 | ............ G01N 21/90 |
| DE | 102017119074 | A1 | * | 2/2019 | ............ G01B 11/26 |
| DE | 102018130940 | | | 6/2020 | ............ G01N 21/90 |
| DE | 102018130940 | A1 | * | 6/2020 | ............ G01N 21/01 |
| DE | 102015211317 | B4 | * | 4/2021 | ............ B67B 3/261 |
| DE | 102020121088 | | | 2/2022 | ............ G01N 21/90 |
| DE | 102021109286 | A1 | * | 10/2022 | ............ B67B 3/264 |
| DE | 102021121489 | | | 2/2023 | ............ G01N 21/90 |
| EP | 4332556 | A2 | * | 3/2024 | ............ B67B 3/26 |
| JP | 2003002311 | | | 1/2003 | ............ B65B 57/02 |
| JP | 2003002311 | A | * | 1/2003 | |
| WO | 2022033825 | | | 2/2022 | ............ G01N 21/90 |
| WO | WO-2022033825 | A1 | * | 2/2022 | ............ B67C 3/22 |

OTHER PUBLICATIONS

Search Report issued in German Patent Appln. Serial No. 10 2022 122 477.5, dated Jul. 20, 2023, with machine Engiish translation, 14 pages.
U.S. Appl. No. 18/242,462, filed Sep. 5, 2023, Bock.
European Search Report issued in EP Patent Appln. No. 23192939.9, dated Feb. 13, 2024, with machine English translation, 22 pgs.
European Search Report issued in EP Patent Appln. No. 23192953.0, dated Feb. 19, 2024, with machine English translation, 22 pgs.

* cited by examiner

SUPPORT RING CENTERING FOR CLOSURE INSPECTION

BACKGROUND OF THE INVENTION

The present invention relates to a method and an apparatus for inspecting containers provided with closures. Such methods and apparatuses have long been known from the prior art. In the beverage manufacturing industry, beverage bottles are usually fitted with closures and then transported further or, for example, provided with labels. Various problems have been rised when attaching closures to containers. Thus, for example, the closures may sit crooked on containers or may have been destroyed or damaged during the screwing-on operation.

Therefore, apparatuses and methods are known from the prior art which check the proper fit of a proper closure on a container. In this case, it is known from the internal prior art of the applicant to record images of the closures and to represent them, for example, via a development representation over 360°. In some cases, these developments can lead to faulty images, which, however, are not caused by faulty containers or a faulty fit, but rather, for example, by recordings of the container that are slanted for various reasons.

For example, it is known that a reconstruction of a development from camera images is carried out by images and model assumptions of the recording situation and of the body, for example, of the container and of the closure.

It is also known from the internal prior art of the applicant that a model of a recording situation is determined in advance by means of a calibration. Said recording situation should not change during production or inspection of a container flow.

However, it can happen that during an inspection of the container flow, the position of the body, i.e., the container, may change due to carrier misalignment or misalignment of a container on the transport device. In addition, different heights of the containers or slanted mouthpieces can also lead to a change in the recording situation. In the prior art, a position and a vertical axis of the container are usually determined.

The present invention is based on the object of being able to better accommodate such a container situation. The aim is to enable a more refined view of different error situations.

SUMMARY OF THE INVENTION

The invention relates to a method for inspecting containers provided with closures, wherein the closures have a cap portion and a circumferential edge portion or circumferential wall portion extending around a mouth of the containers, and wherein the containers have a rotationally symmetrical element (in particular circumferential) arranged in a region of the mouth of the containers, and wherein the closure ends in a longitudinal direction of the container above the rotationally symmetrical element.

The containers are transported along a predetermined transport path by means of a transport device and, during said transport, the mouth regions of the containers provided with the closures are illuminated by an illumination device, and at least one image recording device records at least two (in particular spatially resolved) images of the mouth regions of the containers provided with the closures.

According to the invention, the image recording device records at least two spatially resolved images of a portion of the circumferential edge and at least one portion of the rotationally symmetrical element, and an overall information is derived from at least these (at least two) images, wherein a value characteristic of a relative position of the closure relative to the container (and/or a state of the closure) is determined from at least these images.

Furthermore, said overall information and/or the characteristic value is corrected by means of a position of the rotationally symmetrical element determined from the images.

It is therefore proposed in this method according to the invention that, in order to determine the position of the closure on the container, the support ring of the container (and/or its position) is also taken into account. It must be taken into account that this support ring is usually connected to the container in one piece.

In a further method according to the invention for inspecting containers provided with closures, wherein the closures have a cap portion and a circumferential edge (or a corresponding circumferential wall) extending around a mouth of the containers, the containers are transported along a predetermined transport path by means of a transport device and, during said transport, the mouth regions of the containers provided with the closures are illuminated by an illumination device, and at least one image recording device records at least one image of the mouth regions of the containers provided with the closures.

According to the invention, the image recording device records at least one spatially resolved image of a portion of the circumferential edge of the closures and, at least one structure present on the circumferential edge is detected and, taking into account at least one value characteristic of this structure, a value characteristic of a relative position of the closure relative to the container and/or for the closure is determined.

This latter invention is based on the idea that such container closures often have a structure such as a corrugation or the like. This structure is used to detect a value characteristic of the vertical position of the closure.

Preferably, a diffuse reflected light method is used in each case for inspecting the closures, i.e., in particular that the image recording device and the illumination device view or illuminate the containers and the closures thereof from the same or similar directions. Particularly preferably, the illumination device illuminates the container and the closure by means of an annular lamp which is preferably mounted concentrically above the closure in the longitudinal direction of the container, and the image recording device records a corresponding image of the closure illuminated in this manner.

Particularly preferably, the container and the container closure are illuminated with white light and in particular with white light LEDs. Particularly preferably, flash lamp illumination is used as illumination. Preferably, the image recording is triggered to the illumination. Particularly preferably, the image recording is also triggered—for example with a light barrier.

In a particularly preferred method, the containers are transported along a straight or circular transport path during their inspection, and in particular along a straight transport path.

As mentioned above, the circumferential edge of the closure may also be referred to as the circumferential wall. Particularly preferably, said circumferential edge or the circumferential wall has an internal thread on its inner surface, which can be correspondingly screwed onto an external thread of the container. As mentioned above, said structure mentioned may particularly preferably a structure which results from a plurality of vertical projections or vertical elevations. These can, for example, be distributed uniformly over the circumferential edge in a predetermined manner.

In a preferred method, the above-mentioned overall information is derived from information of the at least two images. The overall Information can be, for example, information on whether the container closure is correctly positioned on the container.

The rotationally symmetrical element is in particular an element which, in a target state, is rotationally symmetrical with respect to a longitudinal direction of the container.

The container is preferably a plastic container or a glass container.

In a preferred method, the rotationally symmetrical element is selected from a group of rotationally symmetrical elements including a support ring of a plastic container, a mouth tip, in particular of a glass container, a thread mouthpiece, in particular of a glass container, a circumferential recess for gripping the container, a security ring and the like.

Preferably, this rotationally symmetrical element is formed circumferentially with respect to the longitudinal direction, but it would also be conceivable for the rotationally symmetrical element to be formed with interruptions or recesses. In addition, markings or recesses could be arranged on the rotationally symmetrical element, but these are not taken into account in the context of the invention when assessing the rotational symmetry.

In a preferred method, the containers have a support ring (or generally a rotationally symmetrical element) arranged in a region of the mouth of the containers, and the closure ends in the longitudinal direction of the container above said rotationally symmetrical element, and, preferably, the image recording device records an image of this rotationally symmetrical element. As mentioned above, the image recording device particularly preferably records an image of both the closure and the rotationally symmetrical element.

In a further preferred method, the portion of the circumferential edge and/or of the rotationally symmetrical element (from which the image recording device records the image) includes an angle that is greater than 90°, preferably greater than 120°, preferably greater than 140°, preferably greater than 180°, preferably greater than 220°, preferably greater than 270° and particularly preferably greater than 300° and particularly preferably greater than 330°. Particularly preferably, 360° of this circumferential edge is captured. For this purpose, several images can also be recorded, as described in more detail below. In this way, a complete development of the circumferential edge is particularly preferably taken into consideration.

In a further preferred method, at least one second image recording device records at least one spatially resolved image of a portion of the circumferential edge and/or a portion of the rotationally symmetrical element. In this method, at least two image recording devices are used.

Particularly preferably, both images are taken within a time window that is less than 1 s, preferably less than 0.5 s, preferably less than 0.3 s, preferably less than 0.2 s, preferably less than 0.1 s. Thus, it is possible for the first and second image recording devices to record the images substantially simultaneously, or offset only by their flash lamp use.

In this method, the two above-mentioned images are preferably recorded using the two image recording devices.

Preferably, the two image recording devices record the respective spatially resolved images simultaneously.

In a further preferred method, a development image is formed from at least the image recorded by the first image recording device and the image recorded by the second image recording device. This means that the recorded images are processed and placed together in order to generate a larger image, for example in the form of a panoramic image of the container closure and/or the container.

In a further preferred method, this overall image is used to determine the overall information and/or to determine the characteristic value. In addition, the overall information can also be the development image formed in this way.

Preferably, the overall information is a compilation and, in particular, a defined compilation of the two or more recorded images such as, in particular, a development image and/or a panoramic image.

Particularly preferably, the container or the container closure is recorded with at least three image recording devices and preferably with at least four image recording devices. Preferably, a development image is created from the images recorded by these image recording devices (which in this case forms the mentioned overall information).

However, the overall information can also consist of a plurality of values which result from the evaluation of the at least two images.

Particularly preferably, the value characteristic of a relative position of the closure relative to the container is determined from the development image and/or the overall information. In this case, the development image particularly preferably reproduces a 360° (in particular with respect to a longitudinal direction of the container) representation of the circumferential edge and/or of the support ring, and preferably of both the circumferential edge and the support ring.

Particularly preferably, in order to determine a position of the rotationally symmetrical element, specific support points of said rotationally symmetric element are determined.

Preferably, in order to determine said position, a first lateral outer edge (and/or a position thereof) is determined, such as a left edge of the rotationally symmetrical element (in particular by an image evaluation).

Preferably, in order to determine said position, a second lateral outer edge (and/or a position thereof) is determined, such as a right edge of the rotationally symmetrical element (in particular by an image evaluation).

Preferably, in order to determine said position, a central region of the rotationally symmetrical element (and/or a position thereof) is determined, such as an axis of symmetry and/or a plane of symmetry (in particular by an image evaluation).

In a further preferred method, support points of the container closure are also determined, in particular those from which the position of the container closure can be determined.

Therefore, an edge of the container closure or an axis of symmetry of the container closure can also be determined here, which can be carried out in particular by means of image evaluation.

Particularly preferably, the above-mentioned value is determined from a position and/or location of the rotationally symmetrical element (and/or taking into account this position), wherein preferably a normal vector (of the support ring) is determined.

In this way, an orientation of the rotationally symmetrical element, in particular of the support ring, can be determined, which in turn is also taken into account in the evaluation of the development image.

Here, it is taken into account that the position of the support ring and/or a support ring centering also determines the plane position of the recorded image or the image of the circumferential edge.

In a further preferred method, an observation system which has at least two image recording devices is calibrated.

Preferably, this or a calibration is carried out such that a relative position of a first image recording device with respect to a second image recording device is determined.

Preferably, the relative positions of all image recording devices, which are used for the inspection, in particular the relative positions of said image recording devices relative to one another are determined, and, in particular, determined in the context of a calibration.

Particularly preferably, an evaluation of the recorded images is also carried out taking this at least one relative position into account.

In a preferred method, a plane of the rotationally symmetrical element is determined in space. Preferably, this layer is used for correction.

Preferably, a reconstruction of a development from camera images is carried out by the images and/or model recordings of the recording situation. In a preferred method, as described above, a model of the recording situation is determined in advance by a calibration. In particular, this does not change during production or during inspection of the container flow.

During the inspection of the container flow, the position of the body changes due to carrier misalignment or a misalignment of the container, for example, on a transport device. In addition, there may also be a change due to different heights or slanted mouthpieces of the containers. In the prior art, the position and a vertical axis are usually determined.

Within the scope of the present invention, it is now proposed that the position of the closure on the mouthpiece is supplemented by the information of the exact height position of the support ring (or of the rotationally symmetrical element) and/or its orientation, wherein in particular a normal vector of the rotationally symmetrical element is determined here.

Usually, the container closure is applied to and in particular screwed onto the mouthpiece of the container so that the rigid element recorded during the image recording is the mouthpiece. However, after the application of the container closure, the position of the mouthpiece can still be determined by determining the height of the plane position and the position of the support ring or of the rotationally symmetrical element. This is an essential aspect of the invention.

In this way, the reconstruction of the closure and the support ring is free from the changing influences at the time of the recording.

Particularly preferably, the exact determination of the relative position of the closure or of the closure cap to the mouthpiece in a reconstruction image, i.e., a 360° image of the closure and of the support ring, is possible, in particular because this determination is free from disruptive influences.

In a further preferred method, a recorded image and in particular a development image is corrected taking into account a position of the rotationally symmetrical element or of the support ring. In particular, a normal vector of the rotationally symmetrical element is taken into account. This is explained in more detail below with reference to the figures.

In a further advantageous method, the containers have a rotationally symmetrical element arranged in a region of the mouth of the containers, wherein the closure ends in a longitudinal direction of the container above the rotationally symmetrical element, and, preferably, the image recording device records an image of this rotationally symmetrical element.

In a further preferred method, images of the circumferential edge and of the closure are recorded by means of at least three and preferably by means of at least four image recording devices, and these images are preferably combined to form a development image.

In a further preferred method, at least one image recording device records the containers from a direction which includes, with a direction perpendicular to the longitudinal direction of the container, an angle of less than 30°, preferably less than 20°, preferably less than 10°.

In a further preferred method, at least one image is used to capture a structure or an outer surface of the circumferential edge, and, as described in more detail below, values are derived therefrom.

In a further preferred method, imaging parameters are determined by calibration. Both procedures promote in particular the evaluation or assessment of the structure located on the circumferential edge.

In a particularly preferred method, grayscale images or color(-coded) images are recorded.

In a further advantageous method, at least one color-coded image and preferably a plurality of color-coded images is recorded. Particularly preferably, at least one measure for increasing the contrast of the recorded images is carried out.

Particularly preferably, said at least one measure is selected from a group of measures including processing and, in particular, preprocessing of an image in a brightness channel, processing and, in particular, preprocessing of the image in a complementary channel, processing and, in particular, preprocessing of the image in a saturation channel, combinations of these measures and the like.

For this method as well, it must be taken into account that the closure cap fit is crucial for the correct vertical position, but not for the other components of an intact closure.

In the prior art, a transmitted light method was usually used and a shadow outline or its silhouette was evaluated. At times, the problem occurred that a closure cap is indistinguishable from the other elements, such as a connecting element and/or the security ring, or is only to be distinguished to a limited extent. A position determination in the shadow outline of the upper cap geometry, for example, a curvature or deformation of the cap can distort the image after the mouthpiece is applied. The evaluation of a gap between the support ring and/or the rotationally symmetrical element and the security ring can also result in distortions. In addition, these views are only possible in the prior art if the closure is constructed in the same way all around, i.e., retains the same outer sectional shape in all vertical sections.

The starting point now consists in evaluating structures or gloss points on the outer lateral surface of the closure cap. It is possible to do this in the individual views or in a calculated 360° development.

As mentioned above, images recorded by means of imaging optics or intrinsic or extrinsic imaging parameters obtained by calibration can be taken into account in the reconstruction, in particular without distortions, by means of method steps known per se.

In a further preferred method, at least two structures are captured on the circumferential edge (of the closure) and, in particular, two structures separated from one another are captured and, taking into account in each case at least one value which is characteristic of these two structures, the values characteristic of a relative position of the closure relative to the container and/or of the closure are determined.

Therefore, a further improvement is made possible by taking into consideration multiple structures. Particularly preferably, a further improvement can be made by incorporating the support ring centering and thus a better reconstruction of the 360° development.

In a further preferred method, a check and/or plausibility check of the determined values is carried out. This can be carried out, for example, by using a value that is characteristic of a closure cap fit, of a vertical position or of a similar property. In this way, a plausibility check of a closure rotational angle position can be carried out.

These described methods are generally suitable for all types of closures. In a particularly preferred method, the closure is selected from a group of closures including flat caps, sport caps, tethered caps, snap closures and the like. Particularly preferred, however, are closures that are seated on the external threads of the container.

Furthermore, the method can be used if the closure does not have the same structure all around, i.e., does not maintain the same outer section shape in all vertical sections.

In addition, the closures may also be closures formed with or without a dust cap and/or with or without a tamper-evident band or a securing band for detecting an initial opening.

In a further preferred method, the structure of the circumferential edge comprises a plurality of webs and/or lines and/or recesses and/or projections extending parallel to one another in a longitudinal direction of the closure (which in particular is parallel to or coinciding with a longitudinal direction of the container), and, particularly preferably, the value characteristic of the structure is selected from a group of values including a length of said webs (and/or recesses and/or lines), a spacing of said webs (and/or recesses and/or lines) in the circumferential direction, end points of said webs (and/or recesses and/or lines), shaping elements on the circumferential edge, a stiffening structure on the closure, a lip present at the circumferential edge, attachment points of a closure fastening and the like. As mentioned, in this way, for example, the reconstruction of the closure, a security ring, connecting elements and the support ring can be used to create a 360° development.

Particularly preferably, relevant structural parameters are detected, such as an average value of the structures, an elongation, characteristic segments and the like.

Particularly preferably, the structural parameters evaluated in this way are evaluated with respect to a position or slanted position of the closure. In addition, however, further evaluations are also possible, such as an evaluation of a deformation by a deviation from a reference or from a reference set of structural parameters.

In a further preferred method, the recorded images are compared with predetermined reference images. These can be reference images which, for example, are typical for the respective closures recorded or which were recorded of such a closure.

In the further preferred method, as mentioned above, horizontal lips or stiffening structures, for example, can be recorded and/or evaluated.

In a further preferred method, artificial intelligence is used for image evaluation. In this case, in particular for image evaluation, comparisons can be made with reference images.

The present invention is further directed to an apparatus for inspecting containers provided with closures, wherein the closures have a cap portion and a circumferential edge extending around a mouth of the containers, and the containers have a rotationally symmetrical element (10a) arranged in a region of the mouth of the containers, and wherein the closure ends or the closures end in a longitudinal direction of the container above the rotationally symmetrical element.

Said apparatus has an in particular a single-track transport device which transports the containers along a predetermined transport path and an illumination device which illuminates the mouth regions of the containers provided with the closures and/or is suitable for this purpose. Furthermore, at least one image recording device is provided which is suitable and intended for recording one or more spatially resolved images of the mouth regions of the containers provided with the closures.

According to the invention, the at least one image recording device is suitable and intended for recording at least two spatially resolved images of a portion of the circumferential edge and at least one portion of the rotationally symmetrical element, and a processor device is provided which is suitable and intended for determining from at least said image a value characteristic of a relative position of the closure relative to the container (and/or a value characteristic of the closure itself).

In this case, this overall information and/or the characteristic value is corrected by means of a position of the rotationally symmetrical element determined from the images and/or can be corrected accordingly.

A further apparatus according to the invention for inspecting containers provided with closures, wherein the closures having a cap portion and a circumferential edge extending around a mouth of the containers, has a transport device which transports the containers along a predetermined transport path, as well as an illumination device which illuminates the mouth regions of the containers provided with the closures, and has at least one image recording device which is suitable and intended for recording at least one spatially resolved image of the mouth regions of the containers provided with the closures.

According to the invention, a processor device is provided which is suitable and intended for determining, from a structure of the circumferential edge that is detected (in particular visible) in this image, a value characteristic of a relative position of the closure relative to the container and/or a value characteristic of the closure.

Preferably, the transport device is a transport belt, in particular a transport belt, on which the containers to be inspected are transported upright. In this case, this transport belt particularly preferably has guide devices which guide the transport movement and/or the containers during their transport. These guide devices can in particular prevent lateral displacement of the container on the transport belt. In a particularly preferred embodiment, the processor device is suitable and intended for determining a value characteristic of a position and/or location of the support ring. Here, in particular, a normal vector is determined. Particularly preferably, this characteristic value is used to evaluate a correct fit of the support ring and/or to check the fit of the support ring and/or the fit of the closure on the container.

Particularly preferably, the apparatus has at least two, preferably at least three, and preferably at least four image recording devices. Preferably, these image recording devices are each aligned with the mouths and/or the closures of the containers. In addition, however, a recording would also be possible using mirrors, optionally with the same image recording device.

Particularly preferably, the processor device is suitable and intended for increasing the contrast of a recorded image. In this case, for example, preprocessing of a recorded image is carried out in order to increase the contrasts thereof.

Further advantages and embodiments can be seen in the accompanying drawings:

DETAILED DESCRIPTION OF THE DRAWINGS

Figure 1:
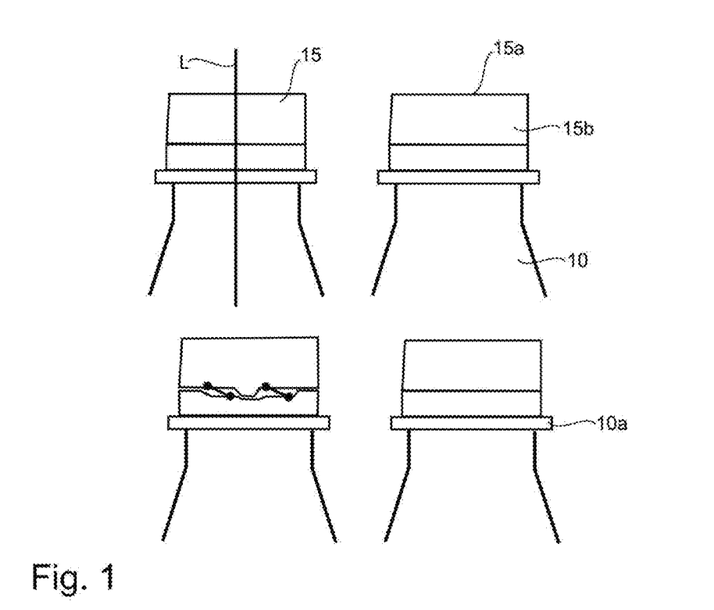
FIG. 1 shows a representation to illustrate the circumstances underlying the invention.

FIG. 1 shows four representations of a container, in this case a plastic container 10 having a container closure 15. Preferably, this container closure is screwed onto a mouth of the container 10.

The reference numeral L refers to a longitudinal direction of the container and also to a longitudinal direction of the container closure 15.

The container closure has a cap portion 15a and a circumferential edge 15b. A structure (not shown) may be formed on the circumferential edge 15b.

Reference numeral 10 a refers to a support ring arranged on the container 10. As shown below, sad support ring is preferably also recorded.

Figure 2:
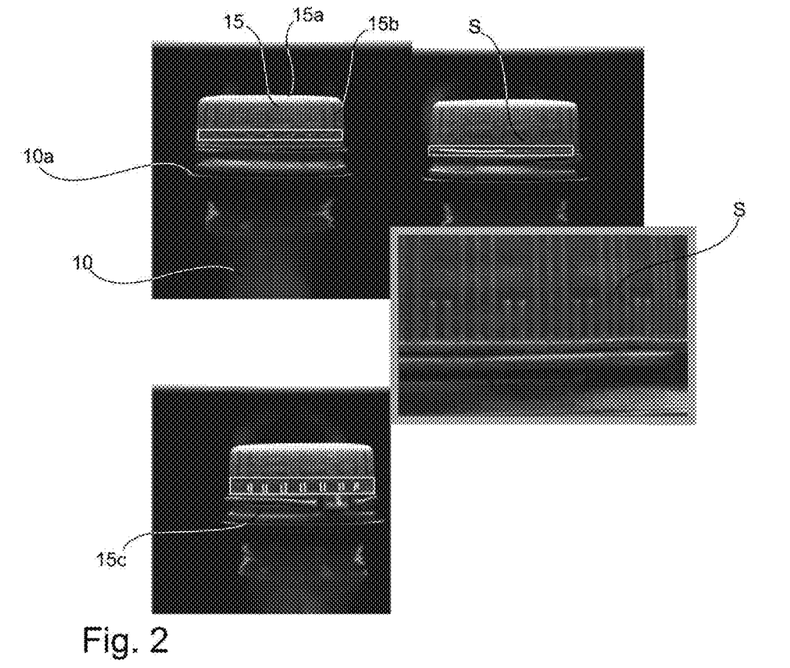
FIG. 2 shows images recorded in the context of an inspection.

FIG. 2 shows an actual image recorded of a container closure, wherein the lower image on the right side showing an enlargement. Here too, the cap section 15a and the circumferential edge can be seen. In addition, a security ring 15c also can be seen, which makes it possible to determine whether the container has already been opened.

Furthermore, a structure S can also be seen at the circumferential edge of the container closure. This structure can also be used to determine a closed state of the container.

A further improvement of the image evaluation is possible by using several structures. In addition, as explained above, it is also possible to incorporate the support ring centering and thus better reconstruct the 360° development.

Figure 3:
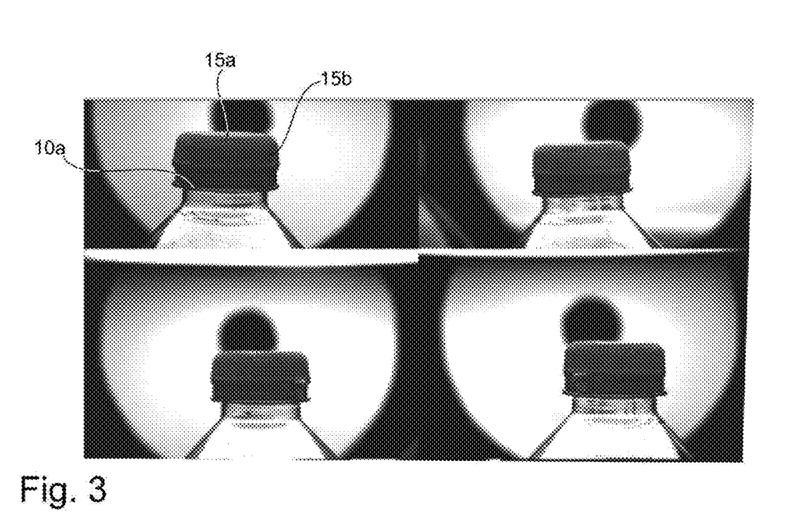
FIG. 3 shows examples of recorded images.

FIG. 3 shows an example in which four images of a container closure have been recorded. This recording can be carried out, for example, by means of four cameras from different sides.

Figure 4:
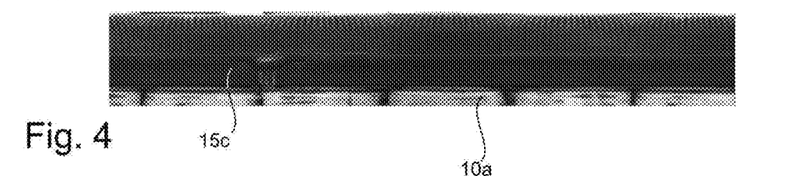
FIG. 4 shows a development of the images recorded in FIG. 3.

Here, a camera recording was carried out approximately in a 90° arrangement. FIG. 4 shows a reconstruction of the closure cap of the security ring, of the connecting elements and of the support ring in a 360° development. In this development, both the security ring 15c and the support ring 10a are visible.

Figure 5:
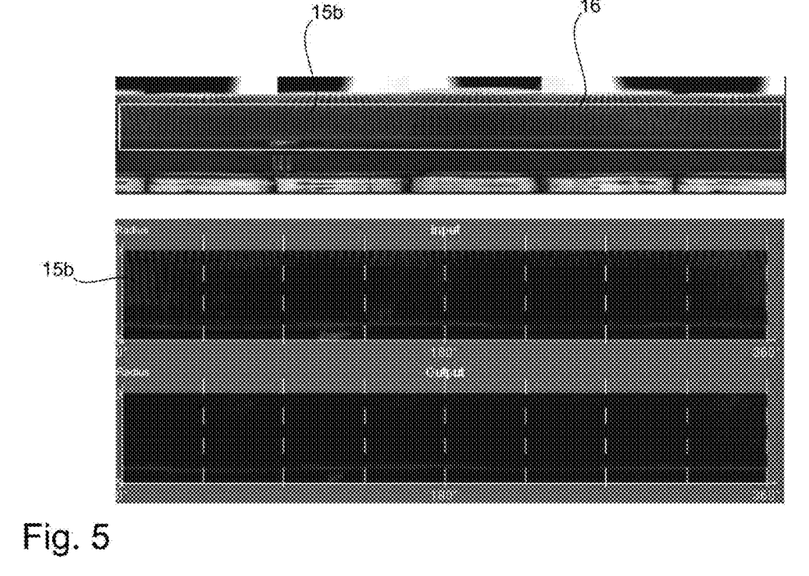
FIG. 5 shows a representation for preprocessing of the recorded images.

FIG. 5 again shows the image shown in FIG. 4, wherein a region 16 is shown in which structures on the circumferential edge 15b are evaluated. In the lower partial image of FIG. 5, measures are shown that serve to enhance contrast. In addition, a preprocessing of the image is preferably carried out in this step of the image evaluation.

Figure 6:
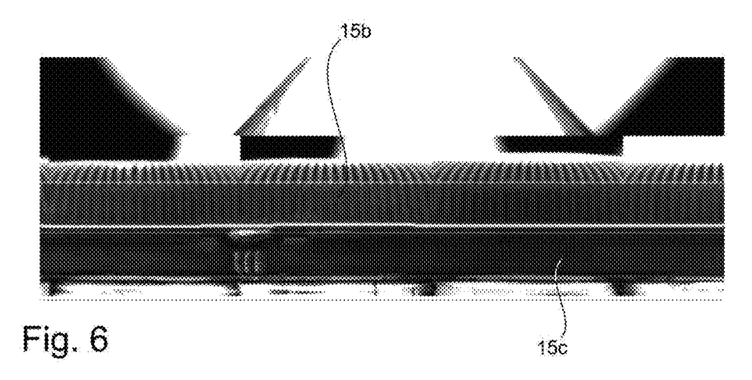
FIG. 6 shows a representation for determining the structures.

FIG. 6 shows an enlarged section of a recorded image. From this image, relevant structural data of the circumferential edge can be determined.

From this image a determination of the relevant structure of the circumferential edge can be carried out. More precisely, the determination is made here on the basis of the shown development, i.e., a 360° structure is evaluated. Advantageously, relevant structural parameters such as mean value, elongation, characteristic sections, etc. are determined or registered.

Preferably, the obtained structural parameters are evaluated with respect to position and/or slanted position. In addition, further evaluations are also possible, such as with regard to deformation, in particular by deviation from a reference set of structural parameters.

Figure 7:
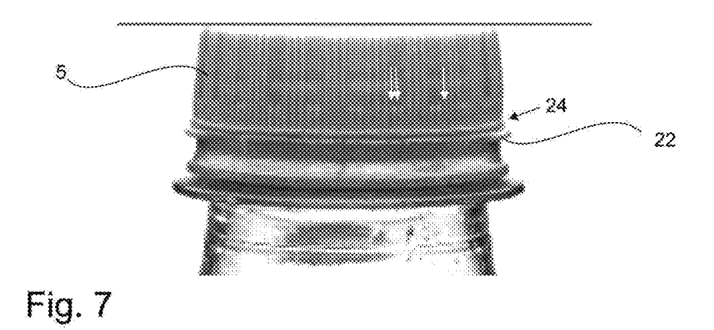
FIG. 7 shows a representation in the presence of multiple structures.

FIG. 7 shows an illustration of a closure having several structures. A horizontal lip 22 and also a stiffening structure 24 of the closure cap edge can be seen here. Furthermore, it can be seen that the end points of the short ribs are shiny. This information can also be used for image evaluation and ultimately for detecting a position of the closure.

Figure 8:
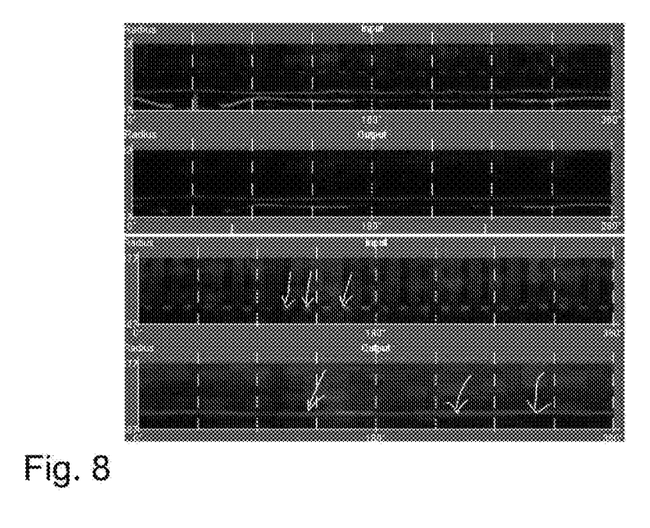
FIG. 8 shows a representation for evaluating an image shown in FIG. 7.

FIG. 8 shows a representation of the image evaluation of the image recorded in FIG. 7. In the upper partial image, a contrast enhancement was carried out in order to better highlight a horizontal lip.

The lower image also shows a contrast increase for determining the end points of the short ribs.

Figure 9:
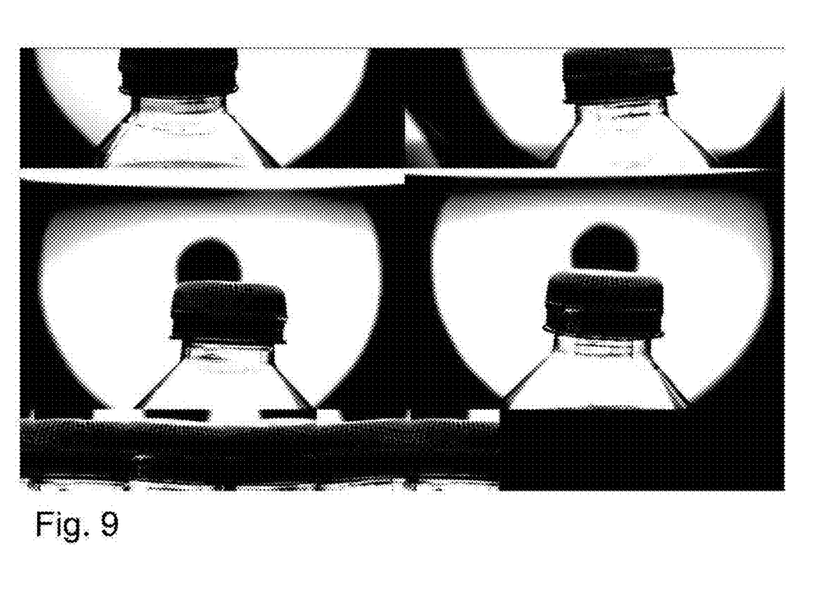
FIG. 9 shows a representation of a recording and a development without correction.
Figure 10:
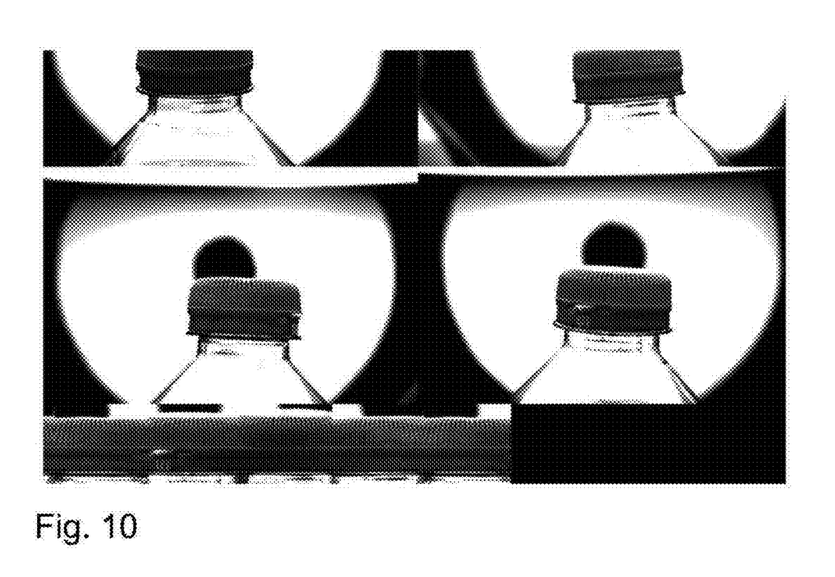
FIG. 10 shows a representation of a recording and a development with correction.

FIGS. 9 and 10 each show four recorded images of a container closure, i.e., images recorded from four directions. It can be seen here that the orientation of these closures is not exactly uniform, for example because the container has a slightly slanted neck.

In both images, a 360° development was performed, each of which was shown in the lower portion of the image. In the case shown in FIG. 9, no correction was made, which leads to a sinuous line like representation.

In the representation shown in FIG. 10, a correction was carried out based on the position of the support ring, resulting in the corresponding straight course.

More precisely, in the case of FIG. 10, a determination of the plane position or normal vector of the support ring was performed.

Figure 11:
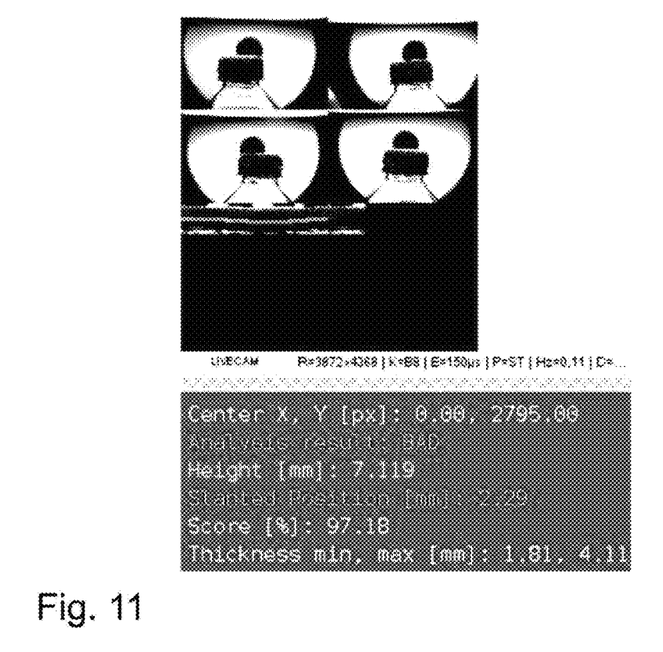
FIG. 11 shows obtained measurement results without correction.
Figure 12:
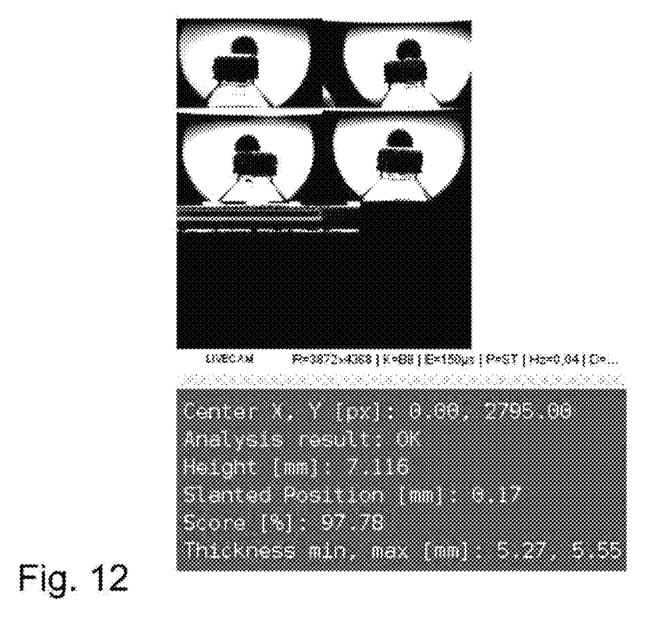
FIG. 12 shows obtained measurement results with correction.

FIGS. 11 and 12 again show the corresponding images together with the resulting evaluation. While the evaluation without correction (FIG. 11) results in the result that the container is faulty (BAD), the evaluation with correction (FIG. 12) results in the container being evaluated as proper (OK).

Figure 13:
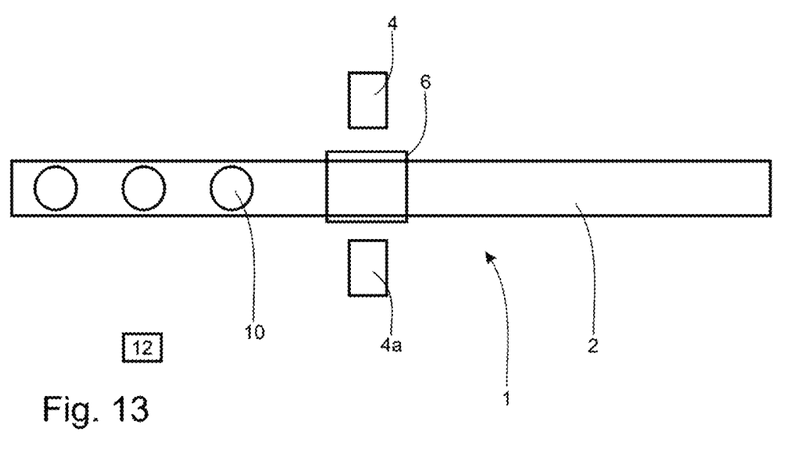
FIG. 13 shows a rough schematic representation of an apparatus for inspecting containers.

FIG. 13 shows a rough schematic representation of an apparatus 1 according to the invention for inspecting containers 10. This apparatus has a transport device such as a transport belt 2, which transports the containers 10 along a predetermined transport path, in this case a straight transport path.

The reference numerals 4 and 4a refer to image recording devices which respectively record images of the filled and closed containers 10. Advantageously, four such image recording devices 4, 4a are provided, which particularly preferably each record four images of the containers from different directions, including by way of example but not limitation a direction perpendicular to the longitudinal direction of the container 10, or an angle of less than 30°.

The reference numerals 6 refer to illumination devices which are preferably associated with the image recording devices and which illuminate the containers 10 at least during image recording.

The reference numeral 12 schematically indicates an evaluation device which evaluates the images recorded by the image recording device(s) and in doings so preferably also carries out the corrections described above.

The applicant reserves the right to claim all features disclosed in the application documents as essential to the invention, provided that they are novel over the prior art individually or in combination. It is also pointed out that features which can be advantageous in themselves are also described in the individual figures. The person skilled in the art will immediately recognize that a particular feature described in a figure can be advantageous even without the adoption of further features from this figure. Furthermore, the person skilled in the art will recognize that advantages can also result from a combination of several features shown in individual or in different figures.

The invention claimed is:

1. A method for inspecting containers provided with closures, wherein the closures having a cap portion and a circumferential edge extending around a mouth of the containers, wherein the containers are transported along a predetermined transport path by a transport device, and during said transport the mouth regions of the containers provided with the closures are directly illuminated by an illumination device, and at least one image recording device records at least one image of the mouth regions of the containers provided with the closures,
    wherein
    the image recording device records at least one spatially resolved image of a portion of the circumferential edge, and at least one structure present on the circumferential edge is detected, and, taking into account at least one value characteristic of this structure,
    a value characteristic of a relative position of the closure relative to the container and/or relative to the rotationally symmetrical element and/or of the closure is determined, and wherein the structure has a plurality of webs and/or ribs extending in a longitudinal direction of the closures and parallel to one another, wherein the value characteristic of the structure is selected from a group of values consisting of a length of said webs, a spacing of said webs in the circumferential direction, end points of said webs, shaping elements on the circumferential edge, a stiffening structure on the closure, a lip present at the circumferential edge, and attachment points of a closure fastening.

2. The method according to claim 1,
    wherein
    the containers have a rotationally symmetrical element arranged in a region of the mouth of the containers, wherein the closure ending above the support ring in a longitudinal direction of the container.

3. The method according to claim 1,
    wherein imaging parameters are determined by calibration.

4. The method according to claim 1,
    wherein
    at least one color-coded image is recorded and at least one measure is carried out to increase the contrast.

5. The method according to claim 4,
    wherein
    this at least one measure is selected from a group of measures including processing the image in a brightness channel, processing the image in a complementary channel, processing the image in a saturation channel, combinations of these measures.

6. The method according to claim 5,
    wherein
    at least two structures are detected on the circumferential edge and, taking into account at least one value characteristic of said two structures, the value characteristic of a relative position of the closure relative to the container and/or of the closure is determined.

7. The method according to claim 1,
    wherein
    the portion of the circumferential edge and/or the support ring includes an angle that is greater than 90°.

8. The method according to claim 1,
    wherein
    at least one second image recording device records at least one spatially resolved image of a portion of the circumferential edge and/or at least one portion of the rotationally symmetrical element.

9. The method according to claim 8,
    wherein
    a development image is formed at least from the image recorded by the first image recording device and the image recorded by the second image recording device.

10. The method according to claim 1,
    wherein
    the closure is selected from a group of closures selected from the group consisting of flat caps, sports caps, tethered caps, snap caps, screw caps, and crown caps.

11. The method according to claim 1,
    wherein
    at least one image recording device records the containers from a direction which, with a direction perpendicular to the longitudinal direction of the container, includes an angle of less than 30°.

12. An apparatus for inspecting containers provided with closures, wherein the closures having a cap portion and a circumferential edge extending around a mouth of the containers, having a transport device configured to transport the containers along a predetermined transport path, and an illumination device configured to directly illuminate the mouth regions of the containers provided with the closures, and having at least one image recording device which is configured for recording at least one spatially resolved image of the mouth regions of the containers provided with the closures,
    wherein
    a processor device is provided which is configured for determining, from a structure of the circumferential edge that is detected in this image, a value characteristic of a relative position of the closure relative to the container and/or a value characteristic of the closure, and wherein the structure has a plurality of webs and/or ribs extending in a longitudinal direction of the closures and parallel to one another, wherein the value characteristic of the structure is selected from a group of values consisting of a length of said webs, a spacing of said webs in the circumferential direction, end points of said webs, shaping elements on the circumferential edge, a stiffening structure on the closure, a lip present at the circumferential edge and attachment points of a closure fastening.

13. The apparatus according to claim 12, wherein
the processor device is configured for increasing the contrast of a recorded image.

14. The apparatus according to claim 12, wherein
the apparatus has at least two image recording devices.

15. The method according to claim 1, wherein
relevant structural parameters are detected, wherein such relevant structural parameters are an average value of the structures, an elongation and/or characteristic segments.

16. The method according to claim 15, wherein
the structural parameters are evaluated with respect to a position or slanted position of the closure.

17. The method according to claim 15, wherein
the structural parameters are evaluated with respect to a deformation by a deviation from a reference or a reference set of structural parameters.

18. The method according to claim 15, wherein
the illumination device illuminates the container and the closure by an annular lamp, wherein the annular lamp is mounted concentrically above the closure in the longitudinal direction of the container and the image recording device records a corresponding image of the closure illuminated in this manner.

19. The method according to claim 1, wherein
the container and the closure are illuminated with white light and in particular with white LEDs or a flash light illumination is used.

20. The method according to claim 19, wherein
the image recording is triggered to the illumination.

\* \* \* \* \*